United States Patent [19]
Schmidt et al.

[11] Patent Number: 6,085,092
[45] Date of Patent: Jul. 4, 2000

[54] METHOD FOR IMPROVING THE RADIO CELL ILLUMINATION IN A CELLULAR MOBILE RADIO SYSTEM AND APPARATUS FOR CARRYING OUT THE METHOD

[75] Inventors: Werner Artur Karl Eugen Schmidt, Boyle, Ireland; Hans-Joachim Stahl, Bonn, Germany

[73] Assignee: Detecon Deutsche Telepost Consulting GmbH, Germany

[21] Appl. No.: 08/807,962

[22] Filed: Feb. 28, 1997

Related U.S. Application Data

[63] Continuation of application No. 08/244,807, Aug. 12, 1994, abandoned.

[30] Foreign Application Priority Data

Dec. 16, 1991 [DE] Germany .............................. 41 41 398
Nov. 28, 1992 [WO] WIPO ..................... PCT/DE92/00994

[51] Int. Cl.$^7$ .................................................. H04Q 7/36
[52] U.S. Cl. .......................... 455/447; 455/442; 455/450
[58] Field of Search ................................... 455/446, 447, 455/436, 442, 443, 450, 62, 63

[56] References Cited

U.S. PATENT DOCUMENTS

| | | | |
|---|---|---|---|
| 4,128,740 | 12/1978 | Graziano | 455/33.3 |
| 4,144,411 | 3/1979 | Frenkiel | 455/33.3 |
| 4,597,105 | 6/1986 | Freeburg . | |
| 4,797,947 | 1/1989 | Cabedz | 455/411 |
| 5,056,109 | 10/1991 | Gilhousen et al. . | |
| 5,067,147 | 11/1991 | Lee | 455/436 |
| 5,088,108 | 2/1992 | Uddenfeld et al. | 455/422 |
| 5,101,501 | 3/1992 | Gilhousen et al. | 455/33.2 |
| 5,241,690 | 8/1993 | Larsson et al. | 455/522 |
| 5,327,577 | 7/1994 | Uddenfeldt | 455/33.2 |
| 5,428,818 | 6/1995 | Meidan et al. | 455/33.4 |

FOREIGN PATENT DOCUMENTS

| | | |
|---|---|---|
| 0 347 396 | 9/1993 | European Pat. Off. . |
| 31 10347 | 7/1983 | Germany . |
| 1-300634 | 12/1989 | Japan . |
| 589 980 | 7/1977 | Switzerland . |
| WO 88/08650 | 11/1988 | WIPO . |

OTHER PUBLICATIONS

Bernhardt, Richard, Macroscopic Diversity in Frequency Reuse Radio Systems, IEEE Journal on Selected Areas in Communications, Jun. 1987, pp. 862–870, vol. SAC–5, No. 5.

Yung, Wing–Po, Outage and Error Probabilities of QPSK with Diversity Reception in Rayleigh Fading and Log–Normal Shadowing Channel, GTE Laboratories, 1989, pp. 0182–0187.

Qualcomm Inc., An Overview of the Application of Code Division Multiple Access to Digital Cellular Systems and Personal Communications Networks, Jan. 11, 1991.

*Primary Examiner*—Edward F. Urban
*Attorney, Agent, or Firm*—Brown Martin Haller & McClain LLP

[57] ABSTRACT

A method for improving the radio cell illumination in a cellular mobile radio system provides that there are a number of neighboring cells adjoining each other and partially overlapping each other, wherein in the marginal region of each cell is arranged at least one fixed transmitter. In order to obtain optimized radio cell illumination, it is provided that the fixed transmitters of neighboring cells directly adjoining a cell transmit to this cell with the same channel group as the fixed transmitter of the cell to be supplied itself. In this way a mobile station located in the cell is supplied not only by one fixed transmitter, but also by the fixed transmitters of neighboring cells. Each fixed station is assigned several sector aerials which at least partially overlap in their transmitting range defined by sectors and which together sweep across at least a range of 360°.

14 Claims, 4 Drawing Sheets

METHOD FOR IMPROVING THE RADIO CELL ILLUMINATION IN A CELLULAR MOBILE RADIO SYSTEM AND APPARATUS FOR CARRYING OUT THE METHOD

This is a continuation of application Ser. No. 08/244,807 filed Aug. 12, 1994, now abandoned.

TECHNICAL FIELD

The invention concerns a method for improving the radio cell illumination in a mobile radio system according to the introductory part of patent claim 1.

STATE OF THE ART

Cellular mobile radio networks are characterised in that the area to be supplied is divided into a number of cells, each of which is supplied by a fixed station. Each cell is assigned one channel group which consists of several channels. By channels are meant hereinafter voice channels, also called traffic channels, via which voice or data communications are held with mobile stations. Accordingly these are duplex radio channels for both directions of transmission, that is, for example, a pair of frequencies with a fixed duplex interval. Channels and likewise channel groups can be separated by the criteria of frequency, time or signal shape (code), or by a combination of these criteria. Below, for a description of the method according to the invention without restricting the generality, it is assumed that a channel group consists of one or more (duplex) frequencies, while the individual channels are operated on such a frequency in a time multiple (time division multiplex). The term 'mobile station' includes all types of equipment, and therefore also portable and hand-held subscribers' equipment.

In order to obtain as high a subscriber capacity as possible, the channel groups are to be capable of being reused as frequently as possible in the area for different connections, that is, repeated in cells which are spatially as closely adjacent as possible (frequency repetitions or channel reuse). At the same time, on the other hand, it must be ensured that there is no common channel interference and hence mutual interference of conversations. An arrangement of cells within which the channel groups assigned to the cells are all mutually different, and which can be repeated spatially with the same assignment of channel groups to cells without gaps in the area, is called a cluster.

In FIG. 1A is shown a septuple cluster arrangement, consisting of hexagonal omnicells. In an omnicell arrangement of this kind, the omnidirectional transmitters are in each case arranged at the centre of the respective cell.

If a mobile station changes during a communication from one cell to a neighbouring cell, a transfer procedure must be carried out by the system. It called a 'hand-over' (in the USA also a 'hand-off'). In the conventional networks according to FIG. 1A, such a hand-over procedure simultaneously requires both switching of the connection from one fixed station to another fixed station, and changing from a radio channel of the previous cell to one of the next cell. In the process there is frequently undesirable multiple switching at the cell borders associated with the risk of losing the connection.

It is known that by the sectorisation of cells, sector cells for short, with corresponding sector aerials, an improvement in the signal-to-noise ratio for the same cluster size can be obtained, or a reduction in the cluster size for the same signal-to-noise ratio. FIG. 1B and FIG. 1C show examples of clusters with sector cells.

FIG. 1C shows a network with 60-degree sector cells. Each hexagonal cell from FIG. 1A is divided by 60-degree directional aerials into 6 triangular sectors which act as independent cells and to which are assigned in each case their own channel groups. In the hexagonal triple cluster shown, therefore, 18 different channel groups are allocated. The advantage over FIG. 1A lies in the better capacity for repetition of the channels due to the smaller cluster size of 3 instead of 7 for approximately the same signal-to-noise ratio. But this advantage is partially cancelled out again by the poorer group gain because of the 18 instead of 7 channel groups. There is no redundancy of supply, i.e. each point of the area is clearly supplied by only one channel group.

FIG. 1B shows a hexagonal triple cluster with 9 rhomboid sector cells with 120-degree directional aerials. Each sector cell is assigned its own channel group as in FIG. 1C, so that here in the triple cluster 9 channel groups are needed. However, the signal-to-noise ratio obtainable is worse than in FIG. 1C, because the main beam directions of common channel cells lie in a line, while in FIG. 1C they are offset from each other. In this network too there is no redundancy of supply.

The arrangements of FIGS. 1A, 1B and 1C belong to the state of the art. The corresponding clusters are therefore known.

Outside the clusters 10, 13, the same arrangements are repeated with homogeneous distributions of field strength, wherein the fixed stations 1–9 transmit in such a way that interference (amplification and triggering of amplitudes of the same wavelength) is avoided.

With the arrangement of such clusters 10, 13, however, is associated the disadvantage that only a small number of channel groups can be made available, which limits the possibility of controlling a plurality of mobile stations located in the respective sector cells.

Another disadvantage of the known cluster concept with sector cells and sector aerials arranged in the marginal region of the sector cells, is that there is only inadequate illumination of the respective sector cell by the fixed station arranged in the marginal region. The further the mobile station moves away from the fixed station, the poorer is the quality of reception, which is also impaired by interference from fixed stations of neighbouring cells.

Moreover the so-called hand-over procedure in the known sector cells according to FIG. 1B is made difficult, for with the only inadequate illumination of the sector cells by fixed stations arranged in the marginal region there can be excessive fluctuations in the receiving field strength in the mobile station, without it already having been handed over to the fixed station of the neighbouring sector cell. The known hand-over procedure is therefore relatively unreliable and its timing is critical.

DESCRIPTION OF THE INVENTION

It is therefore the object of the invention to develop a method of the kind mentioned hereinbefore in such a way that improved radio cell illumination can be achieved with a simplified, interference-free hand-over procedure.

To achieve the set object, the invention is characterised by the technical instruction of claim 1.

A characteristic of the invention is that now a single fixed station is no longer assigned to one cell, but the fixed stations of neighbouring cells which adjoin the first-mentioned cell also transmit to the area of the first-mentioned cell with the same channel group.

This ensures that each mobile station which is located in a cell is supplied not only by the one fixed station located in the sector cell itself, but also by the fixed stations of neighbouring cells.

Each fixed station is no longer assigned one 120° sector aerial, but now 6 which each overlap by 60° in their radiation range. Each of the 6 sectors of a fixed station is assigned its own channel group. Sectors of neighbouring fixed stations facing towards each other have the same channel group and are synchronised with each other. Each mobile station is in principle always newly supplied by the three closest fixed stations. Each channel in each fixed station is provided with an individual power allocation, wherein the respective power of a fixed station on this channel is adjusted proportionally to its contribution at the receiver input of the mobile station, with the added boundary condition that the aggregate power at the receiver input is just above the minimum tolerable signal-to-noise ratio for a given quality of transmission under fading condition (adaptive power allocation). The transmissions of each fixed station on each channel are, according to a separate subject of the invention, pre-emphasised in such a way that the transmission path to the mobile station acts as an equaliser. Hence the contribution of each fixed station at the location of the receiver is optimally equalised and the individual contributions are superimposed on each other isochronously. The transmissions of each mobile station are basically received at the three closest fixed stations and then delivered to diversity combining means.

This means that it is decided between the fixed stations transmitting on the same channel group, which fixed station may transmit with what transmitter power to the cell to be illuminated.

If the vehicle is now located for example in the central region between two fixed stations, but remote from the third fixed station, then the power of the individual fixed stations is regulated in such a way that the two fixed stations closest to the vehicle transmit with in each case a portion of their power, while the third fixed station is switched off.

Hence there is the basic advantage that optimum radio cell illumination of the respective cell takes place, because the cell is illuminated from several sides, which was not possible before.

The mobile stations too are regulated in power with control from the fixed side, in order here too to observe the condition of the minimum tolerable signal-to-noise ratio. The parameters for power regulation can be calculated accurately enough from the respective received power.

Altogether the result with this network configuration is a cell pattern again with abstracted hexagonal cells which are interleaved with each other and each of which is assigned its own channel group.

The cells are illuminated from three of the six corners by fixed stations and overlap each other by one-third each. Hence in the end each such cell is covered by two channel groups.

In such a network there are two forms of hand-over. Firstly an implied or 'soft' hand-over which arises by adaptive power allocation on the fixed side and which the mobile station does not recognise. It takes place by progressive transfer between the 3 fixed stations which operate a cell with the same channel group. In this case at least one or two of the fixed stations remain, as before, involved in the link. No change of channels takes place.

Secondly a conventional hand-over with a change of channels in the overlap region between two cells, which therefore always takes place in districts which as a rule are supplied equally well by two fixed stations on both the old and the new channel and which do not coincide with sector borders or conventional radio zone borders. This hand-over is therefore neither unreliable nor is its timing critical.

The power regulation of the fixed stations is determined by means of a mathematical algorithm.

Advantages

Triple clusters with a considerable gain in frequency economy are produced.

The hand-over procedures go 'unnoticed' and are completely free from problems.

The quality of service according to the proposal is substantially higher than in networks known hitherto.

The subject of the present invention results not only from the subjects of the individual patent claims, but also from a combination of the individual patent claims with each other. All the details and characteristics disclosed in the documents—including the abstract—in particular the spatial construction shown in the drawings, are claimed as essential to the invention in so far as they are novel individually or in combination compared with the state of the art.

BRIEF DESCRIPTION OF THE DRAWINGS

Below, the invention is described in more detail with the aid of drawings showing only one embodiment. Here, further characteristics essential to the invention and advantages of the invention are apparent from the drawings and the description thereof.

They show:

FIGS. 1A, 1B and 1C have already been described in the introduction to the specification as cluster concepts belonging to the state of the art. According to FIG. 1B, for example, it is known that the fixed stations 1, 2, 3, 4 shown there radiate the sector cells 20 to 23 with a single sector aerial and an angle of 120°, which is beset with the drawback that, the further the vehicle in the sector cell 20–23 concerned moves away from the associated fixed station 1–4, the poorer becomes the quality of reception.

The closer the vehicle comes to another fixed station in a neighbouring sector cell, the greater is then the risk of there being interference between the channel group in one sector cell (e.g. sector cell 20) and the same channel group in a sector cell of a neighbouring cluster (e.g. sector cell 20a).

Figure 2:
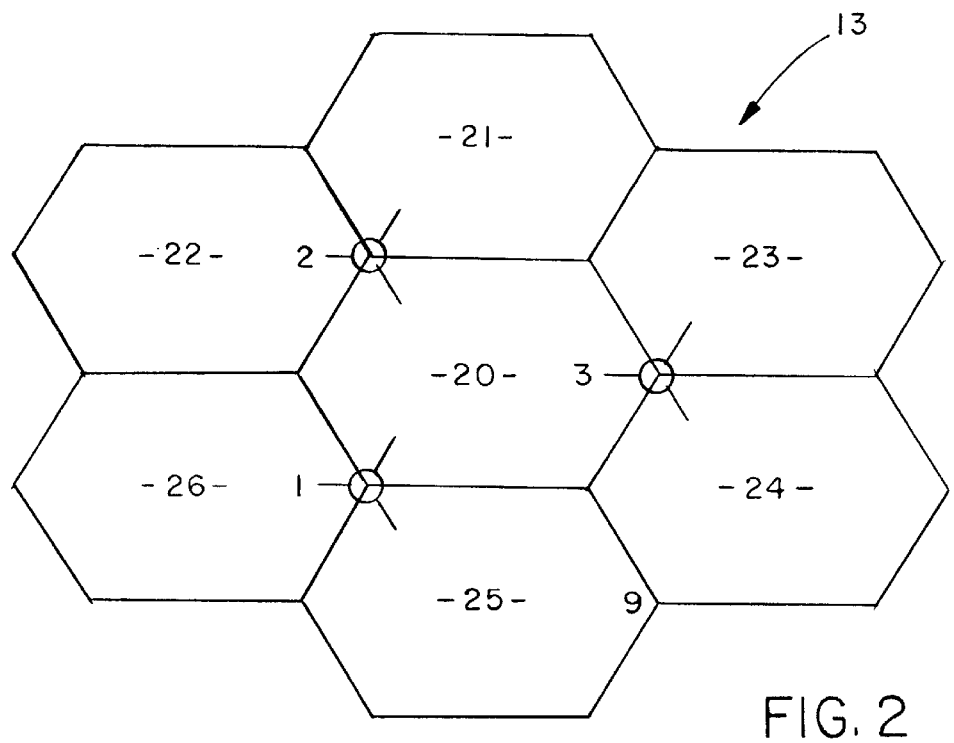

According to the invention, as in FIG. 2 a novel cell concept is proposed, which operates for example with six aerials each overlapping by 60°, wherein the aerial beams of the aerials associated with each fixed station 1,2,3 are shown only schematically in FIG. 2.

FIG. 2 is intended to show that, when a mobile station is located for example in the cell 20, this mobile station (vehicle 34—FIG. 4) is supplied not only by the fixed station 1 directly associated with the cell 20, but also by the fixed station 2 and thirdly also by the fixed station 3.

Analogously, this concept applies to all other neighboring cells 22, 24, 25, 26.

Embodiment of the Invention

Figure 3:
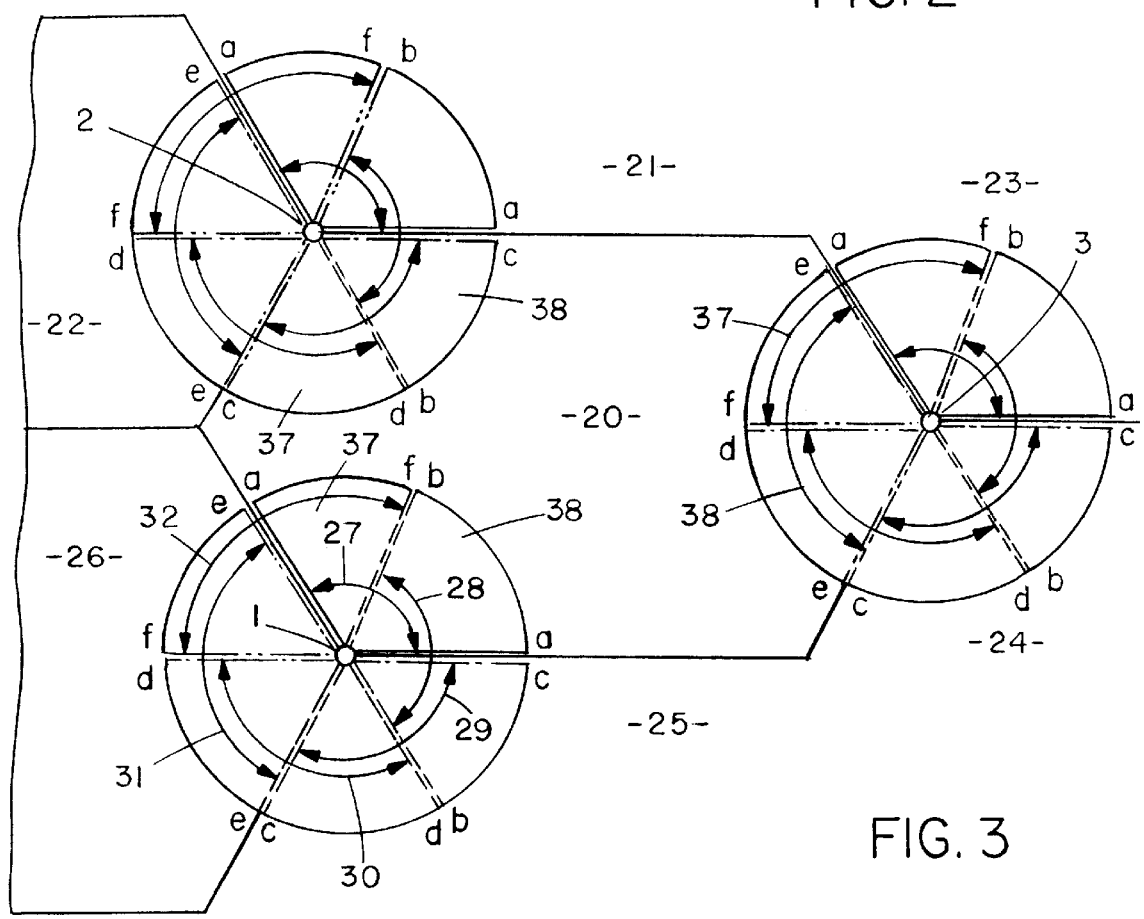
Figure 4:
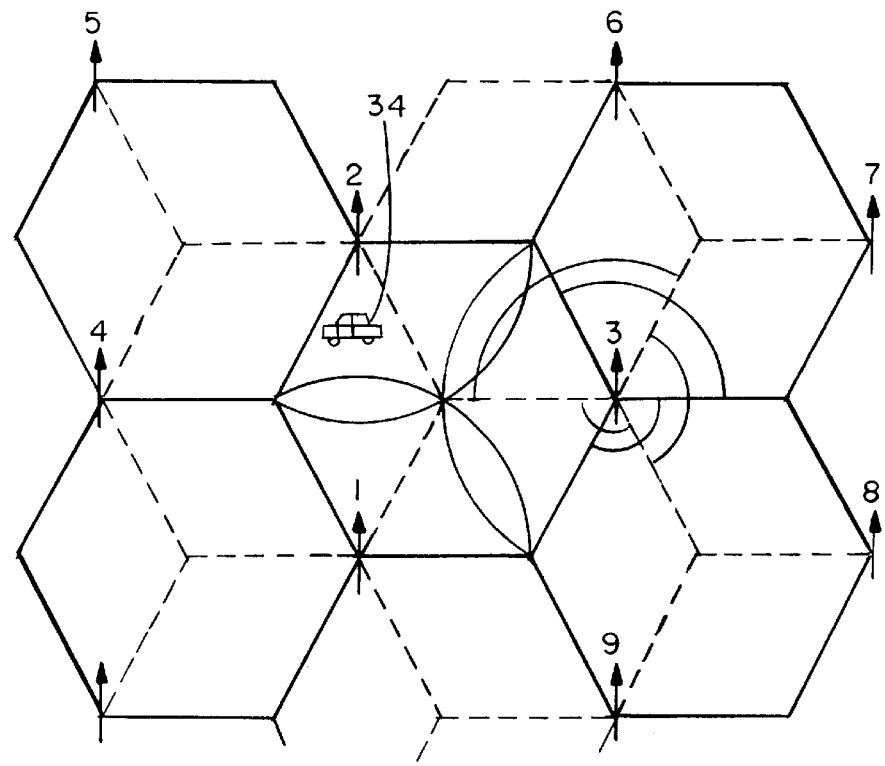

With the aid of a practical example with sector aerials which radiate with a sector angle 12 of 120°, the example schematised in FIG. 2 is to be described in more detail with the aid of FIGS. 3 and 4.

Here, for the sake of simplifying the drawing it is assumed that there are six aerials A,B,C,D,E,F and each of the aerials A–F sweeps across a sector angle a—a or b—b or c—c and so on to f—f.

The fixed station 1 associated with the cell 20 consequently has six aerials which transmit with even distribution over the circumference of a full circle and hence transmit not only to the cell 20, but equally to the neighbouring cells 25 and 26. Additionally, it supplies another three cells of which the hexagonal boundaries are shown in FIG. 4 in broken lines, and two of which overlap the middle cell 20 by one-third each.

The same applies to the fixed stations 2 with their sector aerials which likewise radiate not only to their own cell 21, but also to the cell 20 and the neighbouring cell 22. This fixed station 2 too additionally supplies three more overlapping cells.

Analogously this also applies to the fixed station 3.

It follows from this—referred to the cell 20 to be examined—that a vehicle 34 located in the cell 20 is supplied with transmitted energy from three different fixed stations 1–3.

Figure 1A:
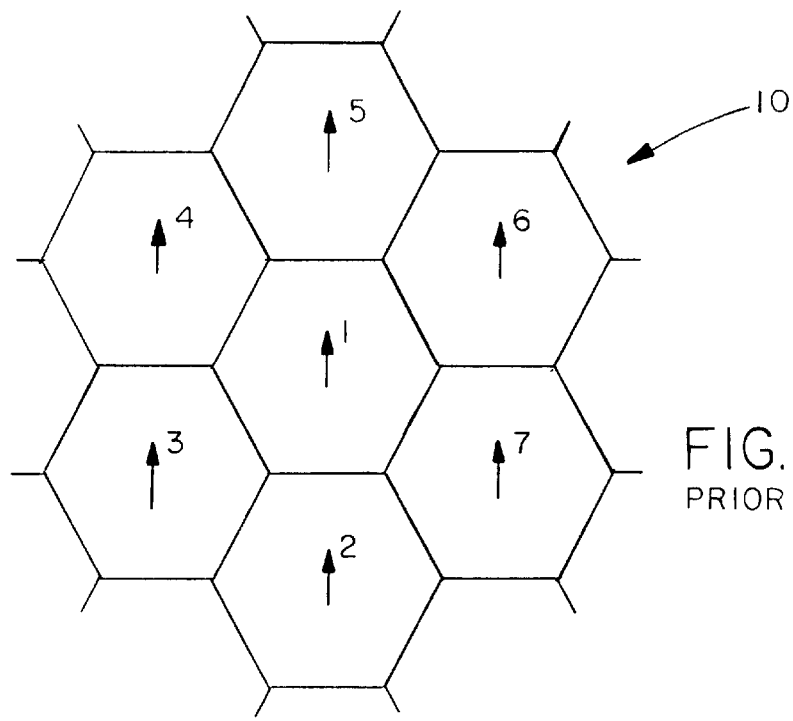
FIG. 1A omnicells according to the state of the art.
Figure 1C:
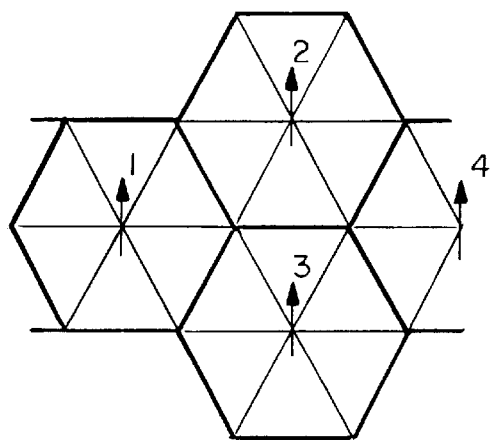
FIG. 1C triangle cells with 60-degree sectors according to the state of the art, FIG. 2 a hexagonal cell pattern with marginal illumination according to the invention, FIG. 3 the middle cell according to FIG. 1 in an enlarged view with further details, FIG. 4 network according to the, invention with 120-degree sector aerials and hexagonal cells with marginal illumination and multiple overlap according to the invention, FIG. 5 hand-over with change of channels in the overlap region of two cells according to the invention, FIG. 6 illumination of the aerials with six channel groups in a triple cluster according to the invention.
Figure 1B:
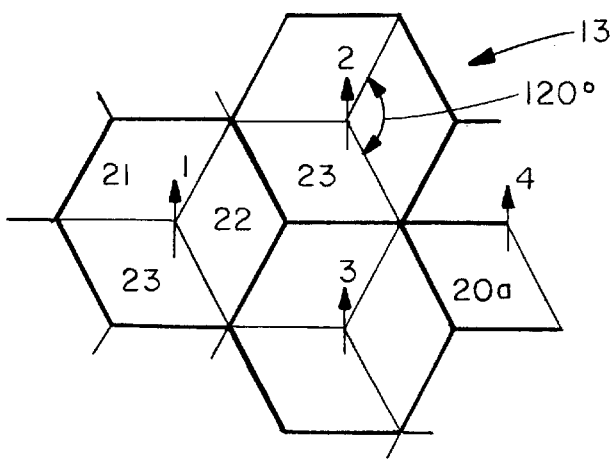
FIG. 1B sector cell with 120-degree sectors according to the state of the art.

Altogether therefore, using six channel groups there are formed two triple clusters which are interleaved with each other and mutually overlap and which are offset from each other by one cell radius, as shown in FIG. 4. It should be pointed out here that the network according to the invention has the same number of fixed stations as the known arrangements of FIGS. 1A, 1B and 1C, and therefore manages without an increase in the number of stations.

The number of possible frequencies is now reached by the overlapping of the aerials A–F as described. Each aerial A–F transmits with a sector angle 27–32 which is indicated as 120° in the practical example. In another embodiment of the invention this sector angle may also be 90° (with a mutual overlap of 45° ) or 60° (with a mutual overlap of 30°).

By the example of FIG. 3 with respect to the fixed station 1 it is shown that, for example, the aerial A overlaps the aerial B in the overlap region 38. similarly the aerial A overlaps the aerial F in the overlap region 37.

An overlap is possible because the aerial A transmits with a different frequency to, for example, the aerial B or the aerial F. Hence the number of possible conversations in the area of the cell 20 is greatly increased, because e.g. 16 voice channels are available both with the one channel group and with the other channel group which also transmits to the cell 20.

It goes without saying that the same conditions must also exist for the other sector aerials of the fixed stations 2, 3. That is to say, referred to the fixed stations 2, with respect to the cell 20 there is an overlap of the aerials C with B and C with D, and it goes without saying that these aerials in each case transmit on the same channel group as the aerials described previously by the example of fixed station 1, in order to supply a. vehicle located in the area of the cell 20 uniformly with the transmitting frequencies generated respectively.

The same accounts moreover apply to the sector aerials of the fixed station 3.

With the aid of FIG. 5 a so-called hand-over procedure at the transition from one cell 20 to a neighboring, overlapping cell will be described.

Figure 5:
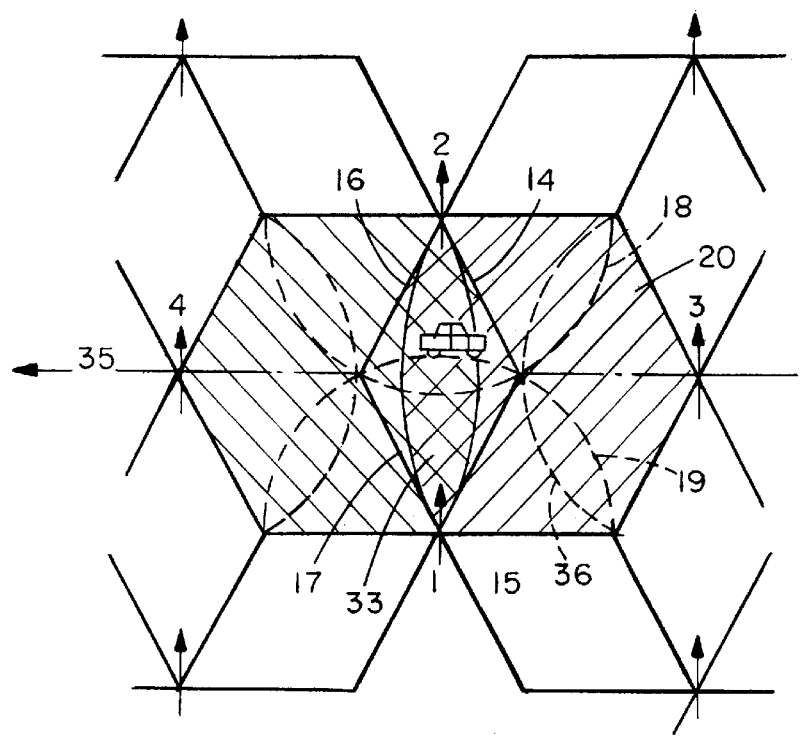

Assuming, for example, that a vehicle is situated as in FIG. 5 and traveling towards fixed station 4. The vehicle is positioned between the two fixed stations 1, 2 and is furthest away from the fixed station 3. All fixed stations 1,2,3 are transmitting with the same channel group of radio frequencies into the cell 20. A conference now takes place between the aforementioned fixed stations 1, 2, 3 with the aim of establishing which of the fixed stations is authorised with what power to communicate with the mobile station (vehicle 34). Since the vehicle 34 receives the transmitted beams 18, 19 from the two fixed stations 1, 2 the strongest and receives the transmitted beam 36 from the fixed station 3 only weakly, the fixed station 3 is switched off, while the other two fixed stations 1, 2 each transmit with about ⅓ of their available power. The 'available power' is here defined as the power which would be sufficient to supply the whole area of the cell 20 with a single fixed station, approximately with a central arrangement according to FIG. A.

By the method according to the invention, within a hexagonal cell the transfer of a connection from one fixed station to another by radio is accomplished by the adaptive allocation of power described above, without a change of radio channel having to be made. The allocation of power is determined by means of a mathematical algorithm.

If the mobile station (vehicle 34) moves from one cell into a neighbouring, overlapping cell, then a hand-over with a change of channels is carried out. In FIG. 5 the cell 20 supplied by the fixed stations 1, 2 and 3 is bounded laterally by the two edges 16 and 17, while the neighbouring, overlapping cell which is supplied by the fixed stations 1, 2 and 4 extends with the edges 14 and 15 into the cell 20.

In the transition region between these two cells there is thus a transfer zone 33 which on account of the transmitted beams 18, 19 of the fixed stations 1, 2 is approximately elliptical. The vehicle 34 in this case moves in the direction of the arrow 35 out of the cell 20 in a direction towards the fixed station 4.

This movement is detected by monitoring between the individual fixed stations 1, 2, 3 and the transmitted beam 36 of the fixed station 3 is interrupted, wherein the mobile station 34 is supplied only by the fixed stations 1, 2 in approximately equal portions.

In this extended elliptical area, a hand-over with a change of radio channel can now be performed. It therefore always takes place in areas which as a rule are supplied equally well by two fixed stations on both the old and the new channel and which do not coincide with sector borders or conventional cell borders. Therefore this hand-over procedure, by contrast with previous networks, by the method according to the invention is reliable, its timing is uncritical, and it is not tied to exact locations. In this way the undesirable multiple switching can also be avoided. Naturally, the procedure described applies in the same way to any directions of movement of a mobile station and its passing into any other neighbouring, overlapping cell.

In addition to the reliability of this procedure, it should be mentioned as a further advantage that the borders within which the channel group of a cell is actually used are reduced to the outer hand-over borders between every two fixed stations, which are approximately elliptical in sections, as shown in FIG. 5 between the fixed stations 1 and 2. Thus the signal-to-noise ratios in the network are improved in addition.

Figure 6:
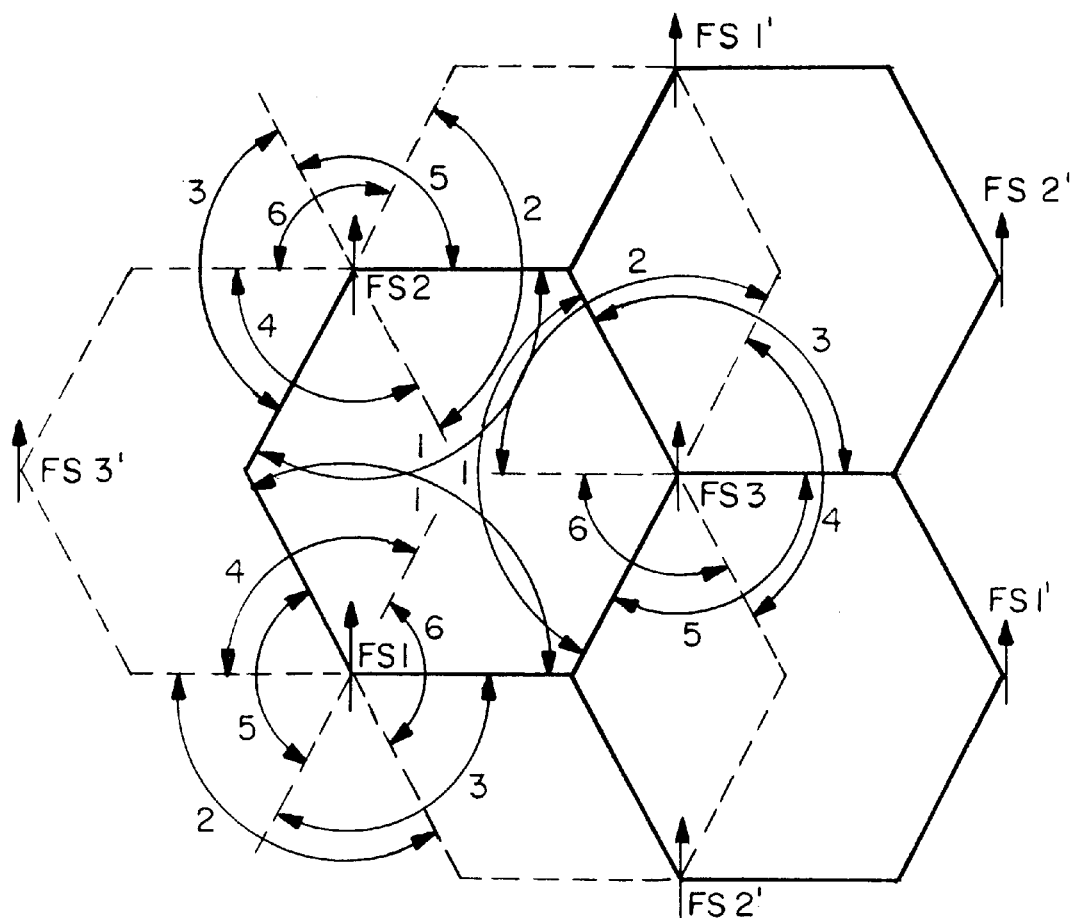

FIG. 6 lastly shows the allocation of the six channel groups 1 to 6 required for a triple cluster, to the 120-degree sector aerials of the fixed stations FS1 to FS3 in such a triple cluster which can be continued in area. Here the FS 1' have the same aerial illumination as FS 1. This applies analogously to FS 2' and FS 3'.

As illustrated in FIG. 6, cell 20 is illuminated by all three fixed stations FS1,FS2 and FS3 with channel group 1, which is the main channel group of cell 20. Cell 20 is also partially illuminated by stations FS1 and FS2 with channel group 4, partially luminated by stations FS2 and FS3 with channel group 2, and partially illuminated by stations FS1 and FS3 with channel group 6. It can also be seen from FIG. 6 that channel group 4 will be the main channel group for the cell immediately to the left of cell 20 which is the cell into which the vehicle is moving in the example illustrated in FIG. 5. Thus, at the hand-over in FIG. 5, the vehicle will be supplied with channel group 4.

Commercial Applicability

In conclusion, the following might be mentioned as the essential advantages of a network according to single or several patent claims of the invention:

- improvement of the reliability of supply by multiple overlap,
- reduction of the transmitter power of fixed stations and mobile stations by transmitter and receiver diversity on the fixed side,
- improvement of the signal-to-noise ratios in the network, which can be converted to a reduction of the common channel repeat interval,
- reliable hand-over procedure of which the time and place are uncritical, without the risk of losing existing connections,
- better load carrying capacity of the channels (group gain) due to smaller number of channel groups, i.e. more channels per channel group, and due to redundancy of supply.

These characteristics lead to a substantial increase in frequency economy, and hence the number of subscribers that can be served in a limited available frequency band, and an improvement in the quality of service offered to subscribers due to improved supply and reliable hand-over procedures, without resulting in an increase in the number of fixed stations.

Legend of drawings

| | |
|---|---|
| 1 | fixed station |
| 2 | fixed station |
| 3 | fixed station |
| 4 | fixed station |
| 5 | fixed station |
| 6 | fixed station |
| 7 | fixed station |
| 8 | fixed station |
| 9 | fixed station |
| 10 | cluster |

-continued

Legend of drawings

| | |
|---|---|
| 12 | sector angle |
| 13 | cluster |
| 14 | edge |
| 15 | edge |
| 16 | edge |
| 17 | edge |
| 18 | transmitted beam |
| 19 | transmitted beam |
| 20 | cell |
| 20a | common channel cell |
| 21 | cell |
| 22 | cell |
| 23 | cell |
| 24 | cell |
| 25 | cell |
| 26 | cell |
| 27 | sector angle aerial A |
| 28 | sector angle aerial B |
| 29 | sector angle aerial C |
| 30 | sector angle aerial D |
| 31 | sector angle aerial E |
| 32 | sector angle aerial F |
| 33 | hand-over zone |
| 34 | vehicle (mobile station) |
| 35 | arrow direction |
| 36 | transmitted beam |
| 37 | overlap region |
| 38 | overlap region |

We claim:

1. A method as of radio cell illumination, comprising the steps of:

forming a cluster of neighboring and adjoining cells, each cell having a marginal region;

arranging at least one fixed transmitter in the marginal region of each cell, including a first fixed transmitter arranged at the marginal region of a first cell and having a sector aerial which sweeps across at least the region of the first cell with radio frequencies of a first channel group;

arranging the fixed transmitters of at least two neighboring cells directly adjoining the first cell to transmit to the first cell with the same radio frequencies as the first fixed transmitter;

each of the fixed transmitters having a fixed channel allocation;

supplying a mobile station situated in the first cell simultaneously with signals in the same channel group of radio frequencies from the first fixed transmitter of said cell and the fixed transmitters of not more than two adjacent cells; and transmitting from each of said three different fixed transmitters a signal with an individual variable power, and adjusting the power of said three fixed transmitters proportional to the contribution of the respective fixed transmitter received at a receiver input of the mobile station.

2. The method as claimed in claim 1, including the step of adjusting the transmitter power of the fixed transmitters in such away that the aggregate power at the receiver input of the mobile station is above a predetermined minimum tolerable signal-to-noise ratio for a given quality of transmission under fading conditions.

3. A method of radio cell illumination, comprising the steps of:

forming a cluster of neighboring and adjoining cells, each cell having a marginal region;

arranging at least one fixed transmitter in the marginal region of each cell, including a first fixed transmitter arranged at the marginal region of a first cell and having a sector aerial which sweeps across at least the region of the first cell with radio frequencies of a first channel group;

arranging the fixed transmitters of at least two neighboring cells directly adjoining the first cell to transmit to the first cell with the same radio frequencies as the first fixed transmitter;

each of the fixed transmitters having a fixed channel allocation;

supplying a mobile station situated in the first cell simultaneously with signals in the same channel group of radio frequencies from the first fixed transmitter of said cell and the fixed transmitters of not more than two adjacent cells; and each channel in each fixed station transmitting with an individual variable power, and the respective power of a fixed station on this channel being adjusted proportional to the received power from a mobile station in the vicinity at the receiver input of said fixed station.

4. A method of radio cell illumination, comprising the steps of:

forming a cluster of neighboring and adjoining cells, each cell having a marginal region;

arranging at least one fixed transmitter in the marginal region of each cell, including a first fixed transmitter arranged at the marginal region of a first cell and having a sector aerial which sweeps across at least the region of the first cell with radio frequencies of a first channel group;

arranging the fixed transmitters of at least two neighboring cells directly adjoining the first cell to transmit to the first cell with the same radio frequencies as the first fixed transmitter;

each of the fixed transmitters having a fixed channel allocation;

supplying a mobile station situated in the first cell simultaneously with signals in the same channel group of radio frequencies from the first fixed transmitter of said cell and the fixed transmitters of not more than two adjacent cells; and transmitting from a mobile station to the fixed transmitter of a cell in which the mobile station is situated, receiving the signal transmitted from the mobile station at the fixed transmitter of the cell in which the mobile station is situated and at the fixed transmitters of adjoining cells, adjusting the transmitter power of the transmitters at which the mobile station signal is received whereby the fixed transmitters which are closest to the mobile station transmit with a portion of their power and the fixed transmitters which are remote from the mobile station transmit with a smaller portion of their power or are switched off.

5. The method as claimed in claim 4, including the step of handing over a mobile station situated in one of the cells which is in a state of communication with the fixed transmitter of that cell from one sector to another sector of the cell by adaptive allocation of power of a plurality of fixed transmitters which illuminate the cell.

6. A method of radio cell illumination, comprising the steps of:

forming a cluster of neighboring and adjoining cells, each cell having a marginal region;

arranging at least one fixed transmitter in the marginal region of each cell, including a first fixed transmitter arranged at the marginal region of a first cell and having a sector aerial which sweeps across at least the region of the first cell with radio frequencies of a first channel group;

arranging the fixed transmitters of at least two neighboring cells directly adjoining the first cell to transmit to the first cell with the same radio frequencies as the first fixed transmitter;

each of the fixed transmitters having a fixed channel allocation;

supplying a mobile station situated in the first cell simultaneously with signals in the same channel group of radio frequencies from the first fixed transmitter of said cell and the fixed transmitters of not more than two adjacent cells; and receiving the transmissions from a mobile station situated in a cell at the fixed transmitter of that cell and the fixed transmitters of at least two adjoining cells, and combining the signals received by the fixed transmitters in a predetermined manner to improve quality.

7. The method as claimed in claim 6, wherein the fixed transmitters of the first cell and two neighboring cells are synchronized with each other.

8. The method as claimed in claim 6, including the step of handing over a mobile station in a state of communication from one cell to a neighboring cell by change of channels, at least one of the three fixed transmitters being linked to the mobile station both before and after the handing over of the mobile station.

9. An apparatus for radio cell illumination in a cellular mobile radio system, comprising:

a plurality of adjoining cells forming a cluster, each cell having a marginal region and adjoining at least one other cell;

at least one fixed station arranged in the marginal region of each cell;

each fixed station comprising a plurality of sector aerials, at least one sector aerial sweeping across at least the region of the respective cell with one channel group;

the aerials overlapping at least partially in their transmitting range and together sweeping across a range of at least 360°;

each fixed station transmitting into the respective associated cell with a predetermined channel group of radio frequencies, the channel groups of adjacent cells being different;

the fixed stations of at least two neighboring cells to an adjacent cell transmitting into the adjacent cell with the same channel of radio frequencies as the fixed station of the adjacent cell;

at least one mobile station situated in a first cell and having a receiver input for receiving signals from said fixed stations in the vicinity;

the fixed stations of the first cell and at least two adjoining cells including means for supplying the mobile station receiver input simultaneously with signals in the same channel group of radio frequencies;

each of the three fixed stations having a transmitter power which is variable for transmitting a signal with an individual variable power, and including an adjustment device for adjusting the transmitter power of the fixed station proportional to the contribution of the respective fixed station at the receiver input of the mobile station.

10. The apparatus as claimed in claim 9, wherein each fixed station is assigned a total of six sector aerials each with a sector angle of 120° and the transmitting ranges of adjacent sector aerials overlap over an angle of 60°.

11. The apparatus as claimed in claim 9, wherein each fixed station is assigned a total of eight sector aerials each with a sector angle of 90° and the transmitting ranges of adjacent sector aerials overlap over an angle of 45°.

12. The apparatus as claimed in claim 9, each fixed station is assigned a total of twelve sector aerials each with a sector angle of 60° and the transmitting ranges of adjacent sector aerials overlap over an angle of 30°.

13. The apparatus as claimed in claim 9, wherein each fixed station transmits with a fraction of the power which would be necessary to supply the whole cell with transmitter power.

14. An apparatus for radio cell illumination in a cellular mobile radio system, comprising:

a plurality of adjoining cells forming a cluster, each cell having a marginal region and adjoining at least one other cell;

at least one fixed station arranged in the marginal region of each cell;

each fixed station comprising a plurality of sector aerials, at least one sector aerial sweeping across at least the region of the respective cell with one channel group;

the aerials overlapping at least partially in their transmitting range and together sweeping across a range of at least 360°.

each fixed station transmitting into the respective associated cell with a predetermined channel group of radio frequencies, the channel groups of adjacent cells being different;

the fixed stations of at least two neighboring cells to an adjacent cell transmitting into the adjacent cell with the same channel of radio frequencies as the fixed station of the adjacent cell;

at least one mobile station situated in a first cell and having a receiver input for receiving signals from said fixed stations in the vicinity;

the fixed station of the first cell and not more than two adjacent cells including means for supplying the mobile station simultaneously with signals in the same channel group of radio frequencies;

the fixed stations of the first cell and two adjacent cells each having a receiver for receiving transmissions from the mobile station; and a combiner for combining the signals received at the fixed stations from the mobile station in a predetermined manner to improve quality.

* * * * *